(12) United States Patent
Heggenhougen

(10) Patent No.: US 10,997,644 B1
(45) Date of Patent: May 4, 2021

(54) ELECTRONIC SYSTEM AND METHOD FOR CONNECTING CURRENTLY AVAILABLE NEARBY SERVICE PROVIDERS WITH CUSTOMERS IN NEED OF SERVICE

(71) Applicant: Rolv E Heggenhougen, Fort Lauderdale, FL (US)

(72) Inventor: Rolv E Heggenhougen, Fort Lauderdale, FL (US)

(*) Notice: Subject to any disclaimer, the term of this patent is extended or adjusted under 35 U.S.C. 154(b) by 184 days.

(21) Appl. No.: 15/281,053

(22) Filed: Sep. 29, 2016

Related U.S. Application Data

(60) Provisional application No. 62/284,386, filed on Sep. 29, 2015.

(51) Int. Cl.
*G06Q 30/06* (2012.01)
*H04W 4/02* (2018.01)
*G06Q 30/02* (2012.01)

(52) U.S. Cl.
CPC ..... *G06Q 30/0625* (2013.01); *G06Q 30/0601* (2013.01); *G06Q 30/0641* (2013.01); *H04W 4/02* (2013.01); *G06Q 30/0282* (2013.01)

(58) Field of Classification Search
CPC ............... G06Q 30/02; G06Q 30/0601; G06Q 30/0625; G06Q 30/0641; H04W 4/02
USPC .................................. 705/26.1, 27.1, 26.62
See application file for complete search history.

(56) References Cited

U.S. PATENT DOCUMENTS 9,843,897 B1 * 12/2017 Lin ........................ G06Q 50/10
10,367,773 B2 * 7/2019 Serad ................. G06Q 30/0213

| | | | |
|---|---|---|---|
| 2003/0023508 A1 * | 1/2003 | Deep .................. | G06Q 30/0283 705/26.1 |
| 2008/0162306 A1 * | 7/2008 | Mahaffey ............... | G06Q 10/02 705/26.1 |
| 2009/0233629 A1 * | 9/2009 | Jayanthi .................. | H04L 51/20 455/457 |
| 2013/0085881 A1 * | 4/2013 | Chary .................... | G06Q 30/02 705/26.1 |
| 2013/0246207 A1 * | 9/2013 | Novak ............... | G06Q 30/0283 705/26.2 |
| 2015/0193850 A1 * | 7/2015 | Tamir ..................... | G06F 17/28 705/26.61 |
| 2015/0278903 A1 * | 10/2015 | Amjadi ............. | G06Q 30/0625 705/26.62 |
| 2015/0339593 A1 * | 11/2015 | Hakeem ............... | G06Q 10/107 701/117 |
| 2016/0092962 A1 * | 3/2016 | Wasserman ............. | H04W 4/40 705/26.7 |

(Continued)

FOREIGN PATENT DOCUMENTS

KR           101366369 B1 *   2/2012   ............. G06Q 30/06

*Primary Examiner* — Yogesh C Garg
(74) *Attorney, Agent, or Firm* — Daniel S. Polley, P.A.

(57) ABSTRACT

An electronic system and method for online searching by a customer for currently available service providers in their geographical area for a specific needed service. The system is programmed to permit service providers to input into the system that they are currently available to provide service. The system can also permit the service provider to also enter later times that they will also be available to provide their services. The system is programmed to preferably only list service providers who are available to provide the desired service at the time requested by the customer as opposed to listing all service providers who can provide the requested service that are registered with the electronic system.

13 Claims, 12 Drawing Sheets

(56) References Cited

U.S. PATENT DOCUMENTS

| | | | | |
|---|---|---|---|---|
| 2016/0180561 A1* | 6/2016 | Dobrowolski | ............ | G06T 11/60 |
| | | | | 345/635 |
| 2016/0203576 A1* | 7/2016 | Novak | ............... | G01C 21/3438 |
| | | | | 705/26.7 |
| 2016/0294994 A1* | 10/2016 | Soruco | ..................... | H04W 4/20 |
| 2017/0220966 A1* | 8/2017 | Wang | ..................... | G06Q 50/30 |
| 2017/0293950 A1* | 10/2017 | Rathod | .................. | G06Q 30/02 |
| 2018/0144380 A1* | 5/2018 | Herken | .................. | G06Q 10/10 |

* cited by examiner

ELECTRONIC SYSTEM AND METHOD FOR CONNECTING CURRENTLY AVAILABLE NEARBY SERVICE PROVIDERS WITH CUSTOMERS IN NEED OF SERVICE

This application claims priority to and the benefit of U.S. Application Ser. No. 62/284,386, filed Sep. 29, 2015, which application is incorporated by reference in its entirety for all intended purposes.

1. FIELD OF THE DISCLOSURE

The invention relates to electronic systems for searching and listings for service providers and particularly to an electronic system and method for searching for service providers that are currently available to provide services.

2. BACKGROUND

Current mobile Apps and online websites for searching for service providers typically provide a static list of service providers for a geographical area. It is then up to consumer to review the information and contact the service provider to set up an appointment. The information typically provided from the search fails to inform the consumer/searcher of the current availability of the service providers listed in the results. Thus, in the event the consumer needs immediate service attention (i.e. busted water pipe, etc.) the consumer has no idea of whether the number they are calling will be able to provide such immediate service. Thus, often the consumer spends a large amount of time until they find a service provider who can handle the immediate needs. The below disclosed system and method are directed to overcoming the above-identified problem with conventional online searching for local service providers.

SUMMARY OF THE DISCLOSURE

A downloadable software application ("App") for connecting, virtually instantly, user/consumers with nearby service professional/service providers. The preferable mobile App when downloaded and running on the consumer's electronic device and an electronic device of the registered service provider who is currently available to provide their registered service(s), provides for connecting ready and waiting consumers with nearby service providers who are currently available to provide the service desired by the consumer.

With the App downloaded and running on the Provider's electronic device, the Provider can select or otherwise indicate that they are "currently available" whenever they choose. The system is programmed to recognize that the Provider is currently available and/or available at a specific time period indicated by the Provider. Thus, when a consumer, who is nearby to the Provider or within a same programmed geographical area to the Provider, runs a search on the App with their electronic device for the service offered by the Provider, the Provider will come up in the search results. Had the Provider not indicated that they were "available" for at the time of the consumer's search or at the time needed by the consumer, the system can be programmed not to list the Provider in the search results or alternatively place the Provider at the bottom after the search results after all of the available Providers have been listed or shown to the consumer.

For the consumer user, once the App is downloaded on their electronic device, the consumer can enter the App and select the appropriate category(ies) from the category menu based on the consumer's needs. Available Providers (as discussed in the preceding paragraph) near to the consumer or within a preconfigured distance (i.e. 10 miles, etc.) are then automatically displayed on the consumer's electronic device. Preferably, not all of the registered Providers who offer the service are displayed. Rather, preferably only the Providers that provide the requested service who have informed the system that they are currently available or available at the specific time needed by the consumer are automatically displayed on the consumer's electronic device.

Once the consumer is provided with the available registered Providers, the consumer can directly connect with the Provider various forms of electronic communication, such as phone call, text message, email, etc. At this point, the consumer and selected Provider can negotiate or otherwise discuss the amount to be paid for the service(s) needed by the consumer that will be provided by the Provider.

Preferably, with an agreement on price and/or scope of services, the consumer and/or provider electronically informs the system that the Provider has been hired to lock in the job. This causes the system to recognizes that the Provider has been hired and is no longer currently available to take another job. Thus, where another registered consumer in the same geographic area runs a search for the services provided by the Provider who was hired by the earlier consumer, the Provider will no longer be listed in the search results displayed on the second consumer's electronic device, unless the Provider has completed the job for the earlier consumer and electronically informs the system that they are again available to provide services.

With an agreement in place, through GPS and mapping, the consumer and Provider can be brought together in real time and the consumer can track the Provider's movements while traveling to the location where the services are to be performed on a map displayed on the consumer's/provider's electronic device(s) (i.e. consumer's residence, consumer's office, other location identified and electronically entered into the system by the user, etc.). Similar, where the consumer travels to the Provider for the services (i.e. lawyer's office, etc.), the movements of the consumer on their way to the Provider can be seen on the displayed map.

Though not considered limiting, the system is preferably designed to receive ratings from the consumer regarding the services provided by the Provider and also ratings from the Provider regarding the consumer. The use of the rating system provides both parties to the transaction (i.e. consumer and Provider) transparency into the other's performances.

Thus, the disclosed novel App/system and method related thereto allows the consumer to cut down wait times for receiving services and also allows the consumer to identify close by Providers. The system also allows for in-depth vetting of all Providers and gives the consumer a choice of nearby Providers to choose from.

The disclosed system provides for virtually instantaneous matches between available professionals and people in need of their immediate services. Thus, the novel App eliminates or reduces nearly all of the wasted time spent to find a service provider with conventional online searching resources. The novel App provides for a connection-enabler relationship between the service provider and consumer. The App allows service providers to obtain additional jobs that in all likelihood they would not receive. The App provides for additional sales channels for the service providers. With the App downloaded and running on their electronic device, consumers can access all service provider details through their profiles. Making direct contact with an available service provider is relatively easy. The number of service categories provided is not limited to any number of categories.

DETAILED DESCRIPTION

Figure 1:
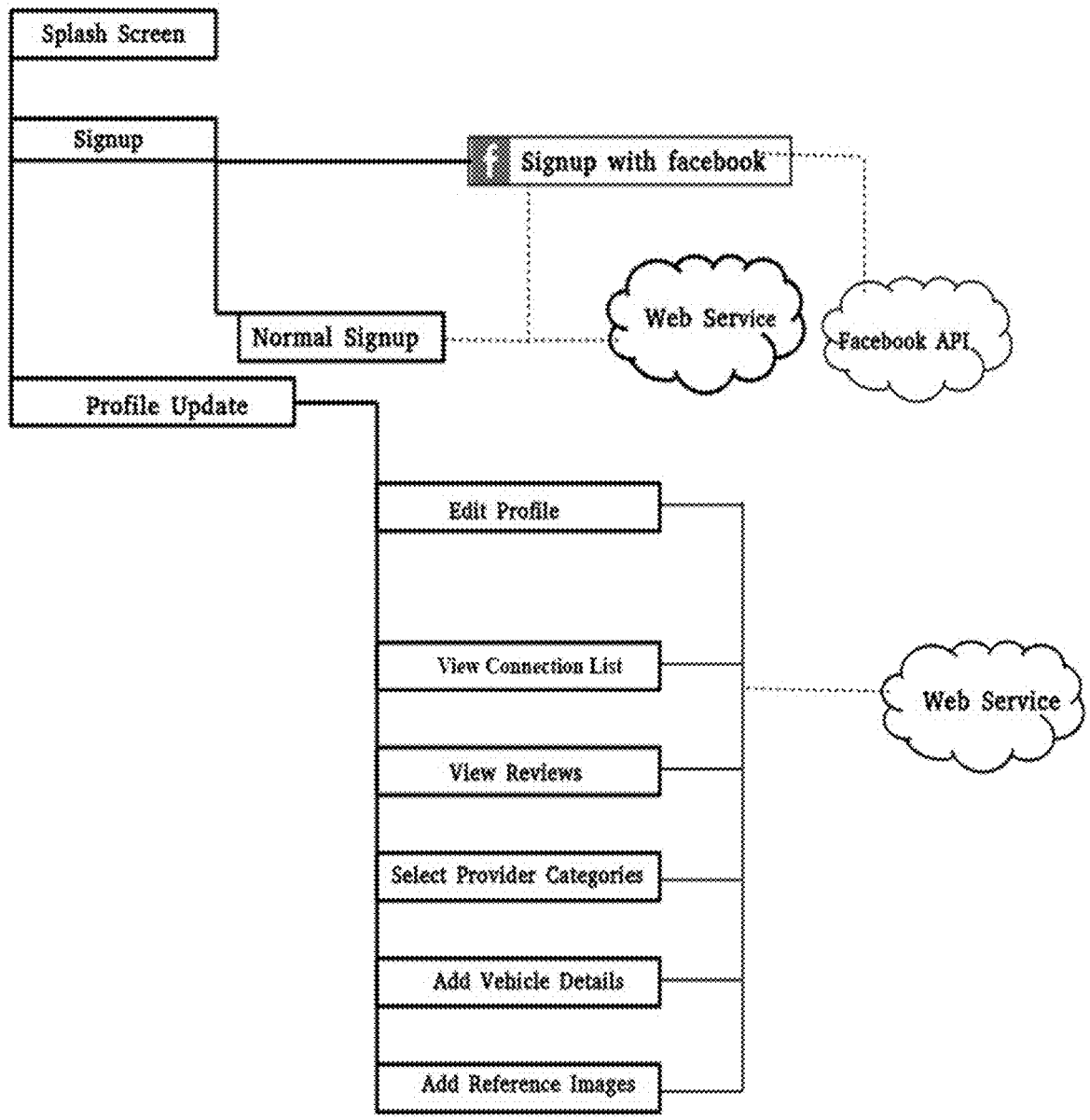
FIG. 1 is a block diagram illustrating certain non-limiting sign up and profile features for the software App in accordance with the disclosed system and method.

As shown in the drawings a novel system and method is disclosed which uses a downloadable software App for connecting, virtually instantly, consumers/customers with nearby service professional/service providers who are currently available to provide service. The preferable mobile App when downloaded and running on the consumer's electronic device and an electronic device of the registered service provider who is currently available to provide their registered service(s), provides for connecting ready and waiting consumers with nearby service providers who are currently available to provide the service desired by the consumer. Thus, the consumer is preferably provided only with a list of available service providers as opposed to a list of all registered service providers who perform the services needed.

The software App preferably generally combines a social network with an electronic map service, such as, but not limited to, Google Maps and GPS technology that permits customers to request services from an available service provider or professional, as well as permitting friends to connect and request favors from their friends.

Generally, the novel software App described above and below can be connected with application program interfaces ("APIs"), allowing users to connect, request service and review each other. The APIs communicate to and from and allow for the App to function properly. Once a service category has been selected, the App allows the customer to see service provider who are currently available close to the customer. By service provider indicating that they are currently available, the App by preferably only displaying available service providers, allows the service provider to also generate additional business that they may not have otherwise received. Payment for the services can be made through the App or can be negotiated or paid at a later time between the customer and the service provider.

Preferably, the mobile App can be provided in both IOS/Android platforms, though such is not considered limiting, and other currently available or later developed platforms can also be used and are considered as within the scope of the disclosure. As mentioned above, the App can be designed to integrate with third party software, such as, but not limited to, social media sites (Facebook, Google, LinkedIn, etc.), Google APIs, Payment sites (Stripe, PayPal, etc.).

FIG. 1 illustrates the social aspect for the novel App for the disclosed system and method. Preferably, the App is downloaded to a customer's mobile electronic device, such as, but not limited to smart phone, tablet, etc. The App can also be downloaded to an electronic device at the customer's location (i.e. desktop computer, laptop computer, etc.). Once downloaded, the customer either signs up (i.e. first time using the App) or signs in. In addition to customers downloading the App onto their electronic device, professionals/service providers (collectively "Provider") also download the App and register their respective services into the system when signing up. A user or provider can also signup or log in using their Facebook™ or other social media account. When using a social media site for logging in, the App can read the user's public profile, image(s) and id from their social media account. The App interact and communicates with a Facebook API in order to obtain the information for the consumer or provider (collectively referred to as "user").

The user can also sign up to the services provided by the novel system and method that are offered through the App by providing an email address. Here the email address can be verified by sending a verification code or link by email to the email address provided by the user or by another method specified by the user when signing up (i.e. text message to the user's cell phone, etc.).

Once registered/signed up, the user can preferably login using their registered email or username and a password. The App can also be programmed to keep the user logged in while the App is running.

Once the user's profile has been entered and saved/stored in a remote database or local database also running on the user's electronic device, such profile can be subsequently updated and edited by the user. As non-limiting examples, the user can edit their basic details such as first name, last name, phone number etc. The user can also upload a profile image of the user and can also change their profile image.

As also seen in FIG. 1, the App also allows a user to view their connection list, such as, but not limited to, showing the user other user(s) that they have recently contacted with through the App. The App can also allow a user to view reviews/ratings for the user that were provided by other users. Similarly, the App can also allow the user to view reviews/rating that the user provided for other users.

Numerous service categories can be provided by the App for the consumer to select from. Though not considered limiting, the Providers when registering for their service, in addition to contact information, can also include any licenses or certificates that have received, indicate whether they are insured and can also provide information regarding work experience. The App can also the Provider to provide any other information that the Provider believes could be relevant decision making in selecting a service provider (especially where the App identifies/displays to the consumer two or more service providers currently available in the area to provide the service requested by the consumer).

Though not limiting, where the service provided by the service provider involves use of a motor vehicle as part of the service (driver, delivery person, etc.), the Provider can provide information and details regarding the vehicle, such as, but not limited to, vehicle type (make and model), vehicle color, number of seats, license plate and/or picture or image of the vehicle. In one non-limiting embodiment, a screen or page for entering the vehicle information will appear when the provider picks a services category such as, but not limited to, "Ride, Pickup and Delivery" as the type of service provided by the person. Similar category description/terminology can be used for naming the category and is also considered within the scope of the disclose.

For other categories, where appropriate, the provider can add a work reference image, which can also include, without limitation, pictures or images showing the work truck, and can also provide other information related to the services or service provider, that could be considered relevant to the consumer (e.g. when selecting the service provider, for safety purposes, etc.).

Figure 2:
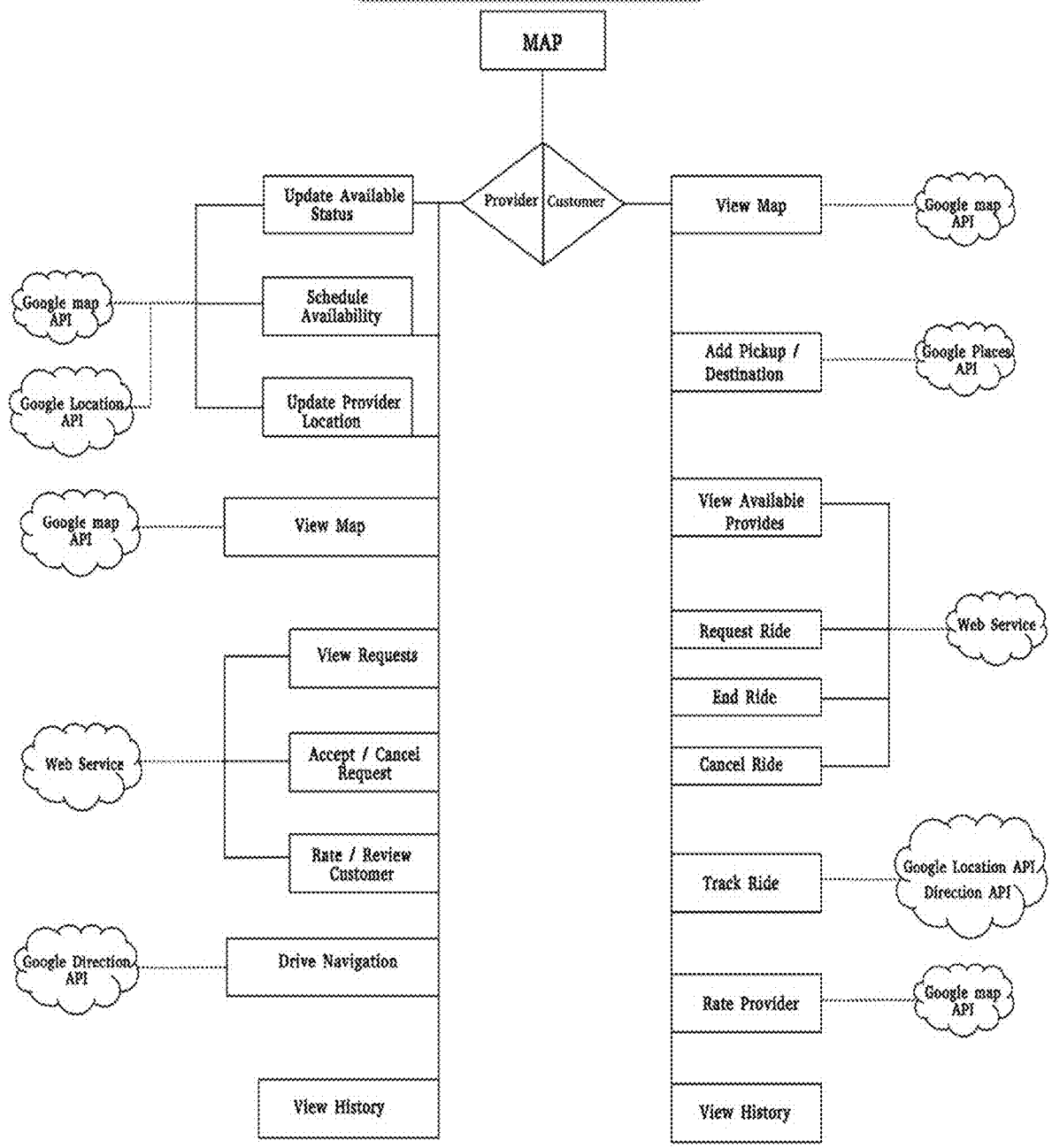
FIG. 2 is a block diagram and process flow diagram showing in general the steps performed from the service provider perspective and from the consumer's perspective for a Ride Pickup and Delivery service category.

FIG. 2 illustrates a non-limiting embodiment for using and providing Ride services with the App, such as when the above-identified Ride, Pickup and Delivery category is selected. The left side of FIG. 2 shows the inner workings and process flow from the Provider's standpoint and the right side shows the inner workings and process flow from the consumer's standpoint. A geographical map that is used by both provider and consumer is provided and in communication with the App. Using the App, the provider enters that they are available to provide their vehicle related service. Using a Google map API and a Google Location API the provide availability schedule and location are updated to the web server or other server used by the system to perform service search requests. The provider can see on the screen of their electronic device a symbol, icon or other visual representation representing their vehicle and its current location on the displayed geographical map. When a matching service request from a consumer is processed by the web service, the service request appears on the provider's screen. The provider can either accept, ignore or cancel the request. Where the request is accepted or cancelled, the web server of the system processes the acceptance or cancellation accordingly. Where accepted the rate information can be provided/displayed and any previously posted reviews concerning the service requesting customer can be displayed on the provider's electronic device screen. Where the provider cancelled the request, the web service can process the action by removing the provider from the list of currently available providers sent to the consumer responsive to the service request.

Where the service request is accepted. The consumer's location or the location for pickup or delivery is provided to the provider (this information can also be provided as part of the initial display of the service request—prior to the request being accepted or cancelled). A symbol, icon or other visual representation for the consumer can appear on the map of the provider's screen showing the location of the consumer. Using a navigation API, such as, but not limited to, Google Directions API, navigation instructions (visual, text and/or audio) can be provided to the provider to assist the provider in arriving to the consumer's location. Once the service has been completed, both the provider and the consumer can enter ratings and/or other comments regarding the transaction/service provided and which can be viewed on the provider's screen.

From the consumer standpoint, after selecting the Ride, Pickup Delivery category from the choice of categories displayed on the consumer's electronic device screen, a map can be displayed (i.e. through Google Map API, etc.) on the user's screen. The user is prompted or otherwise enters the location of the pickup, delivery or destination, which can be entered in connection with Google Places API though such is not considered limiting. After entering the location information, the web server, web service, cloud based server, cloud based service or other electronic processing server or services (collectively "web service") processes the information and determines which registered providers for the App are currently indicating that they are currently available and are shown or determined to be in the geographical area (i.e. nearby, a few miles away, etc.) of the consumer. The list of providers meeting these criteria (which can be one or more providers) is transmitted/sent to the electronic device of the consumer by the web service and displayed on the screen of the consumer's electronic device. The consumer can either select a provider, or end the listing of a specific provider as one of the available providers or cancel/end the ride/delivery request using the web service. Where the consumer selects a service provider, the consumer and provider are connected, and a visual image (i.e. symbol, icon, etc.) representing the provider can appear on the map displayed on the consumer's screen. The consumer can track the movements of the provider driving to perform the service (pickup or delivery) and after the consumer has been picked (i.e. ride request) on the consumer's screen using Google Location API, Direction API and/or similar types of APIs. A rate provider can also be provided using Google Map API. Once the service has been completed, both the provider and the consumer can enter ratings and/or other comments regarding the transaction/service provided and which can be viewed on the consumer's screen.

Figure 3:
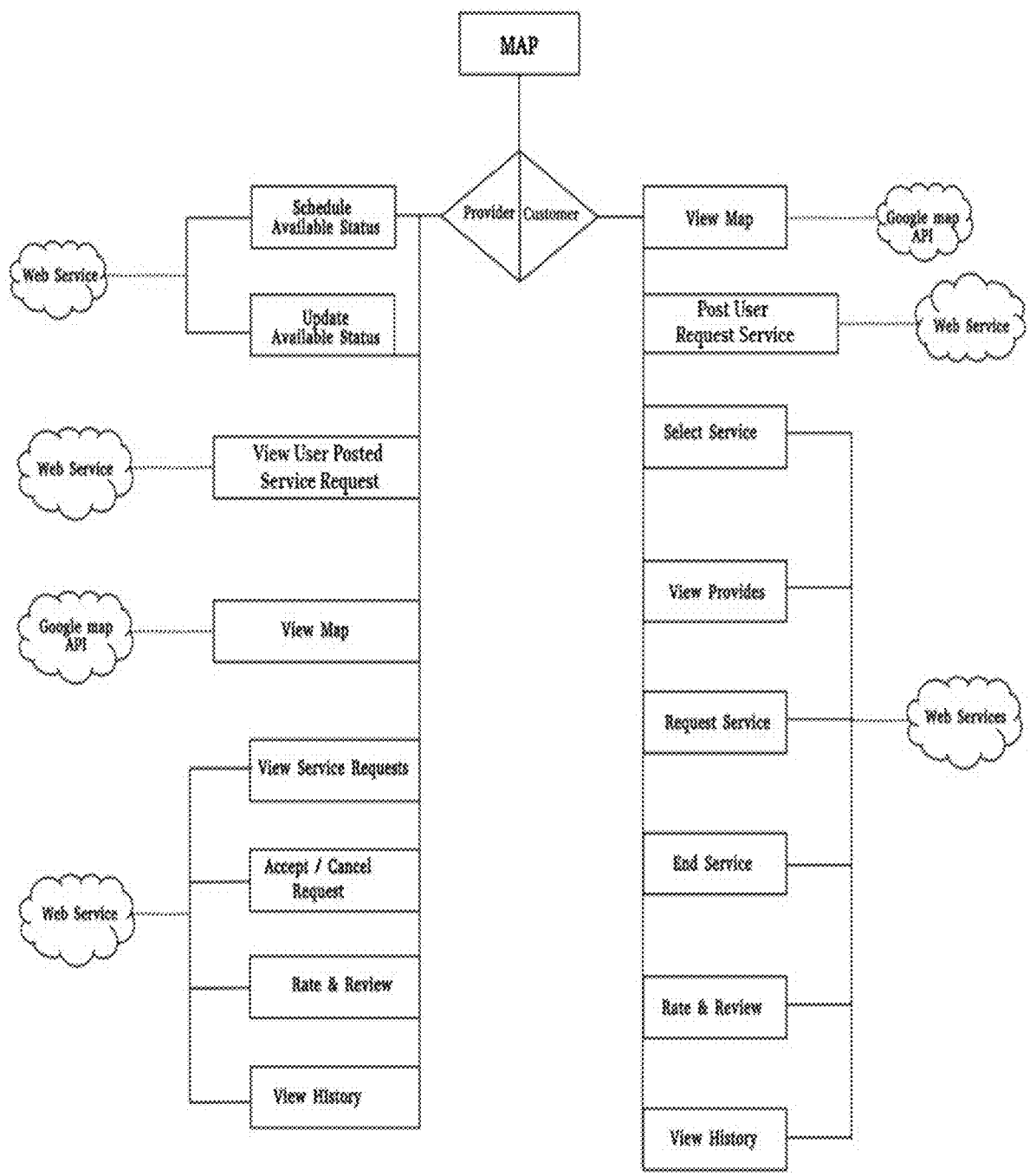
FIG. 3 is a block diagram and process flow diagram showing in general the steps performed from the service provider perspective and from the consumer's perspective for one or more of the service categories.
Figure 4:
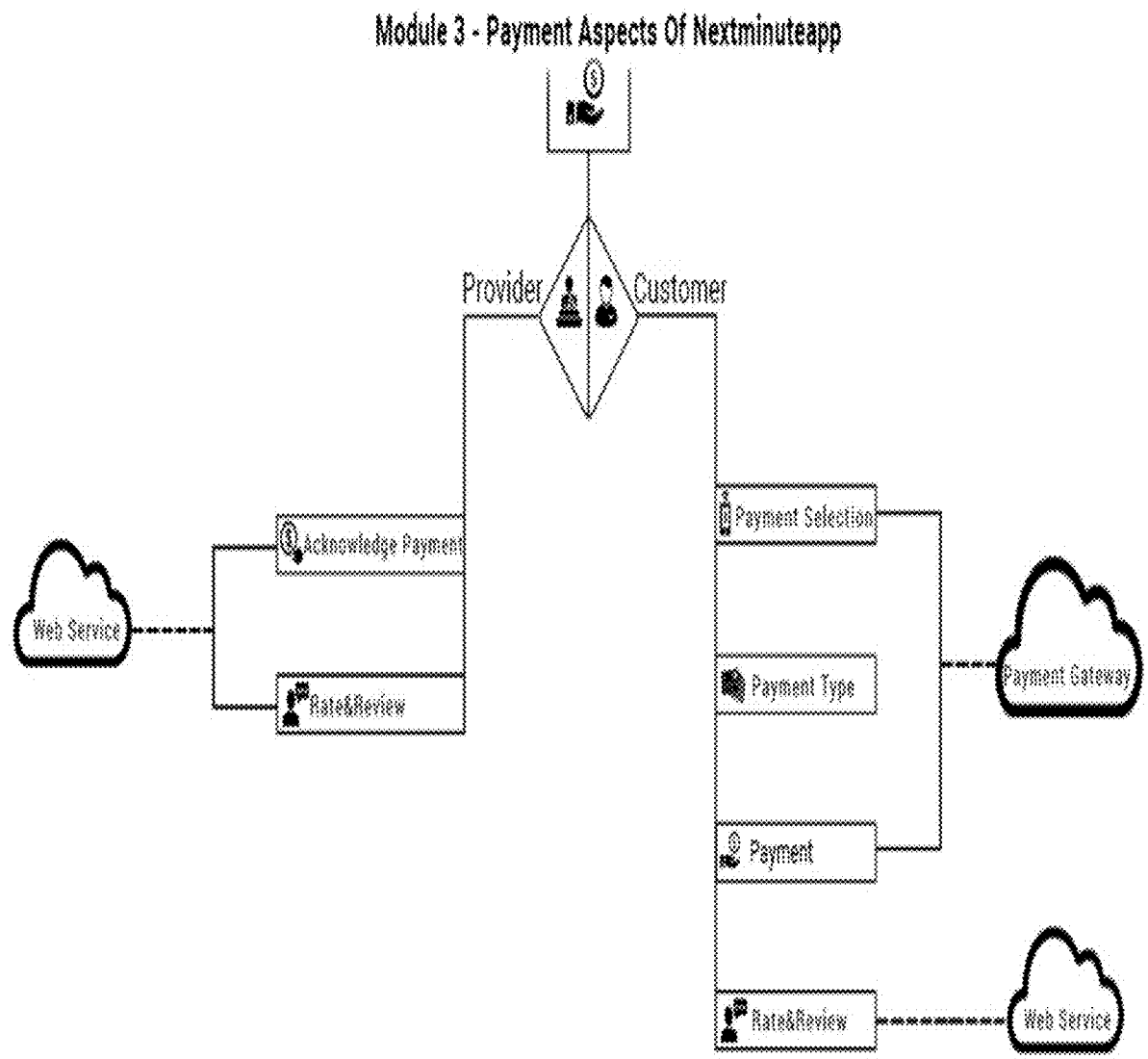
FIG. 4 is a block diagram for a first embodiment for a payment module/platform that can be used with the software App of the disclosed system and method.
Figure 5:
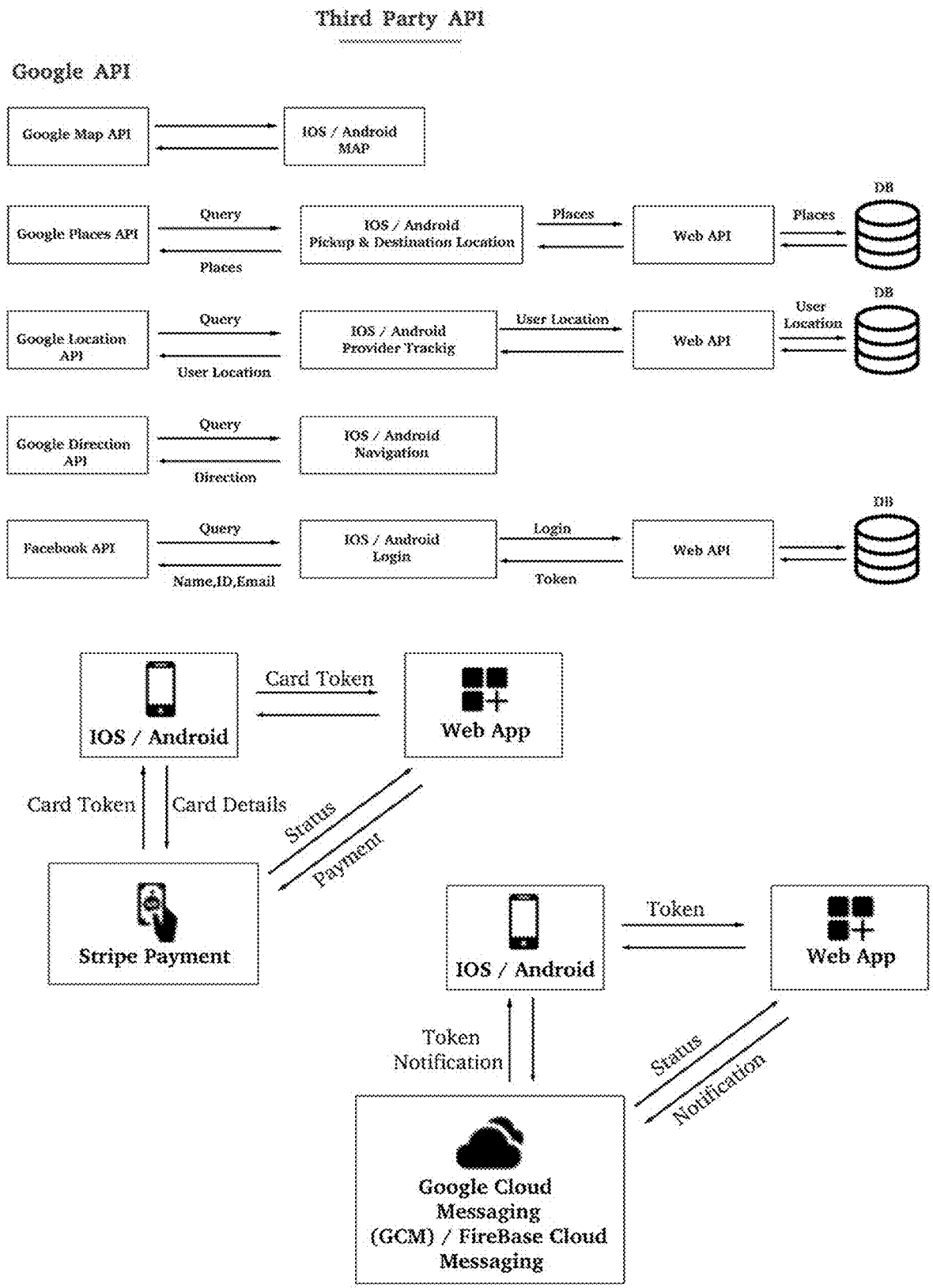
FIG. 5 is a block diagram and communication flow illustrating several non-limiting application program interfaces that can be used for the disclosed system and method.
Figure 6:
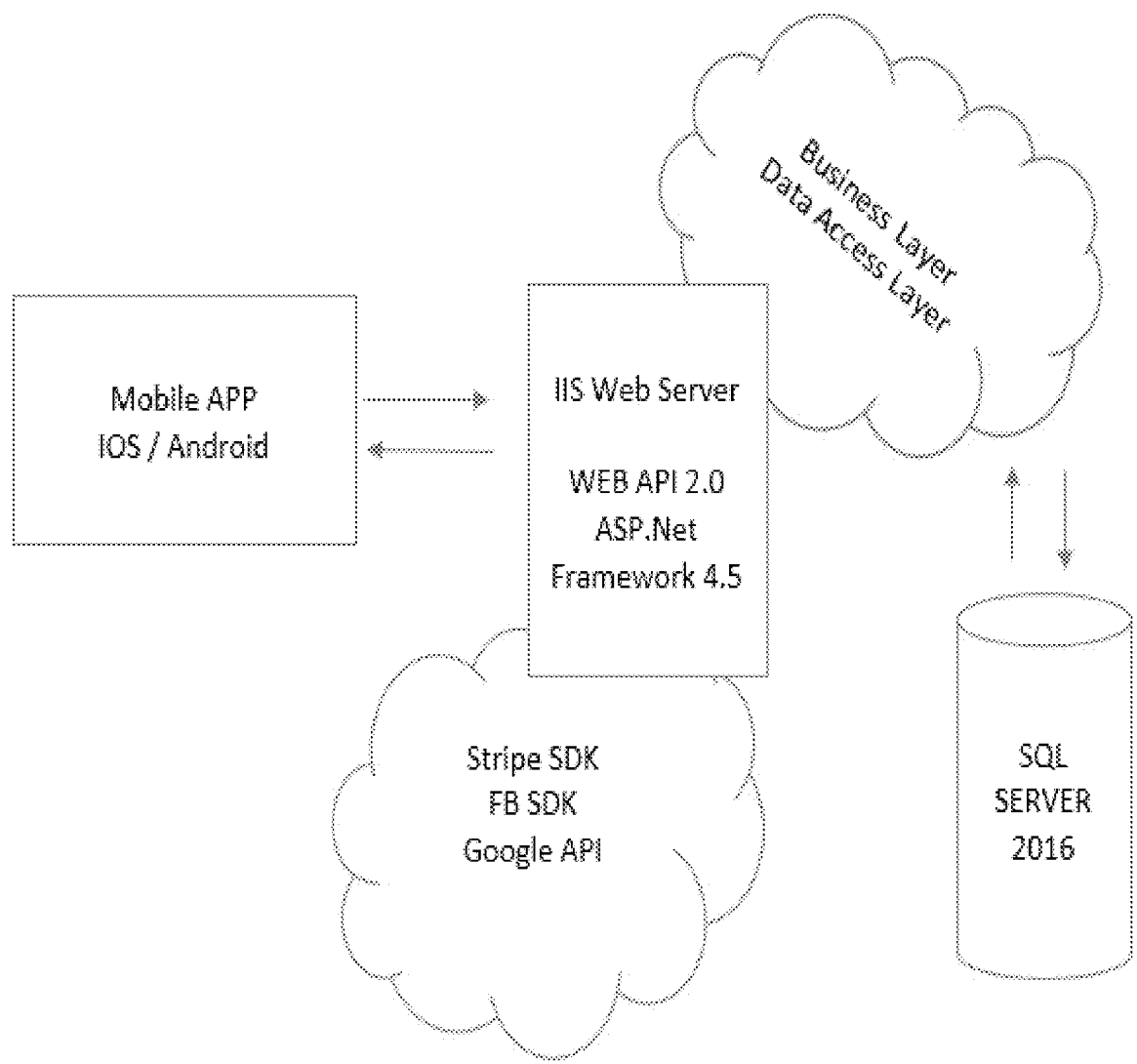
FIG. 6 is a block diagram and communication flow illustrating one non-limiting embodiment for the disclosed system.
Figure 7:
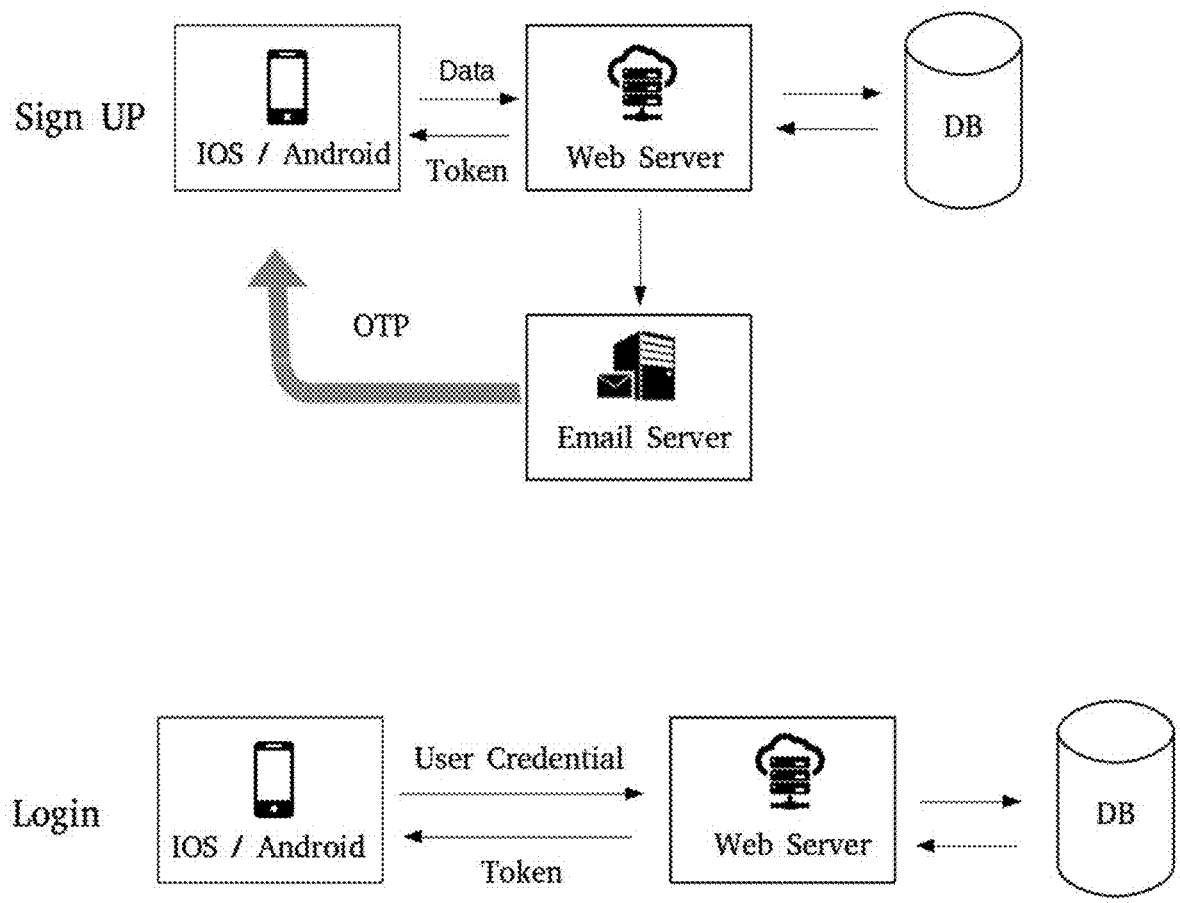
FIG. 7 illustrates a block diagram for one non-limiting embodiment for the system components with and without an email server.
Figure 8:
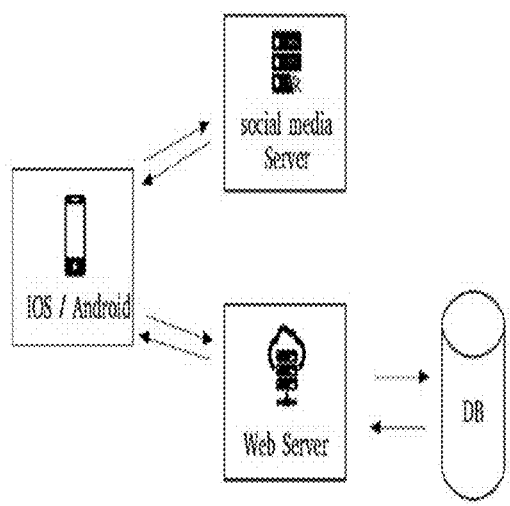
FIG. 8 illustrates a non-limiting login workflow and application program interface workflow for the disclosed system and method.
Figure 8:
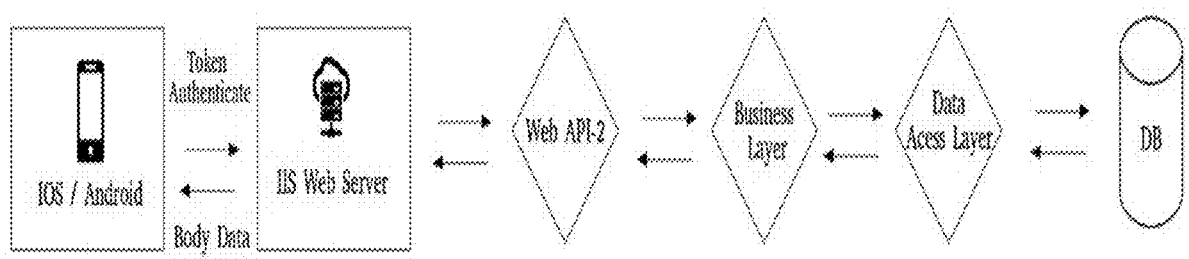
Figure 9:
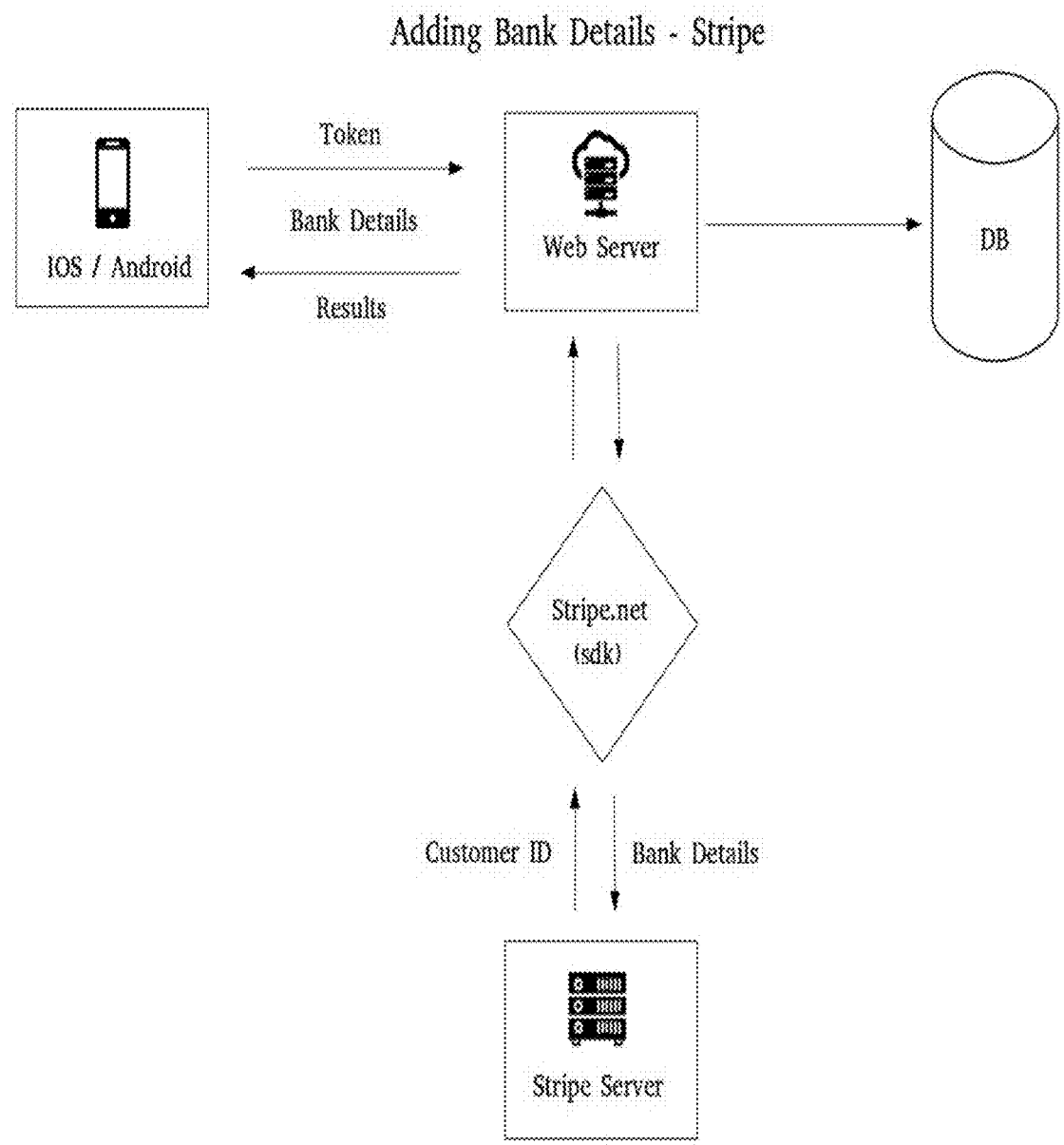
FIG. 9 illustrates a block diagram and communication flow when adding a non-limiting payment module to the disclosed system and method.
Figure 10:
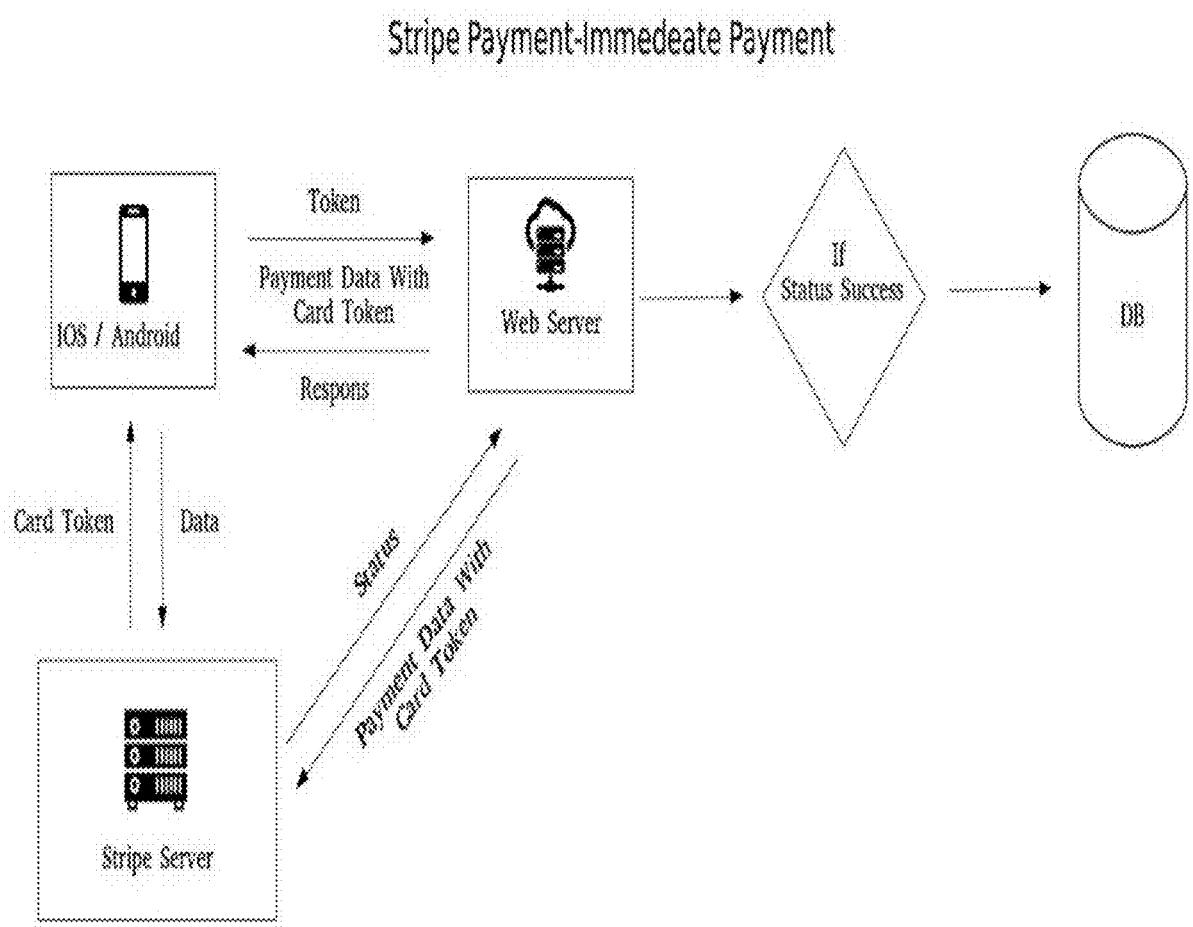
FIG. 10 illustrates an alternative block diagram and communication flow when adding a non-limiting payment module to the disclosed system and method.
Figure 11:
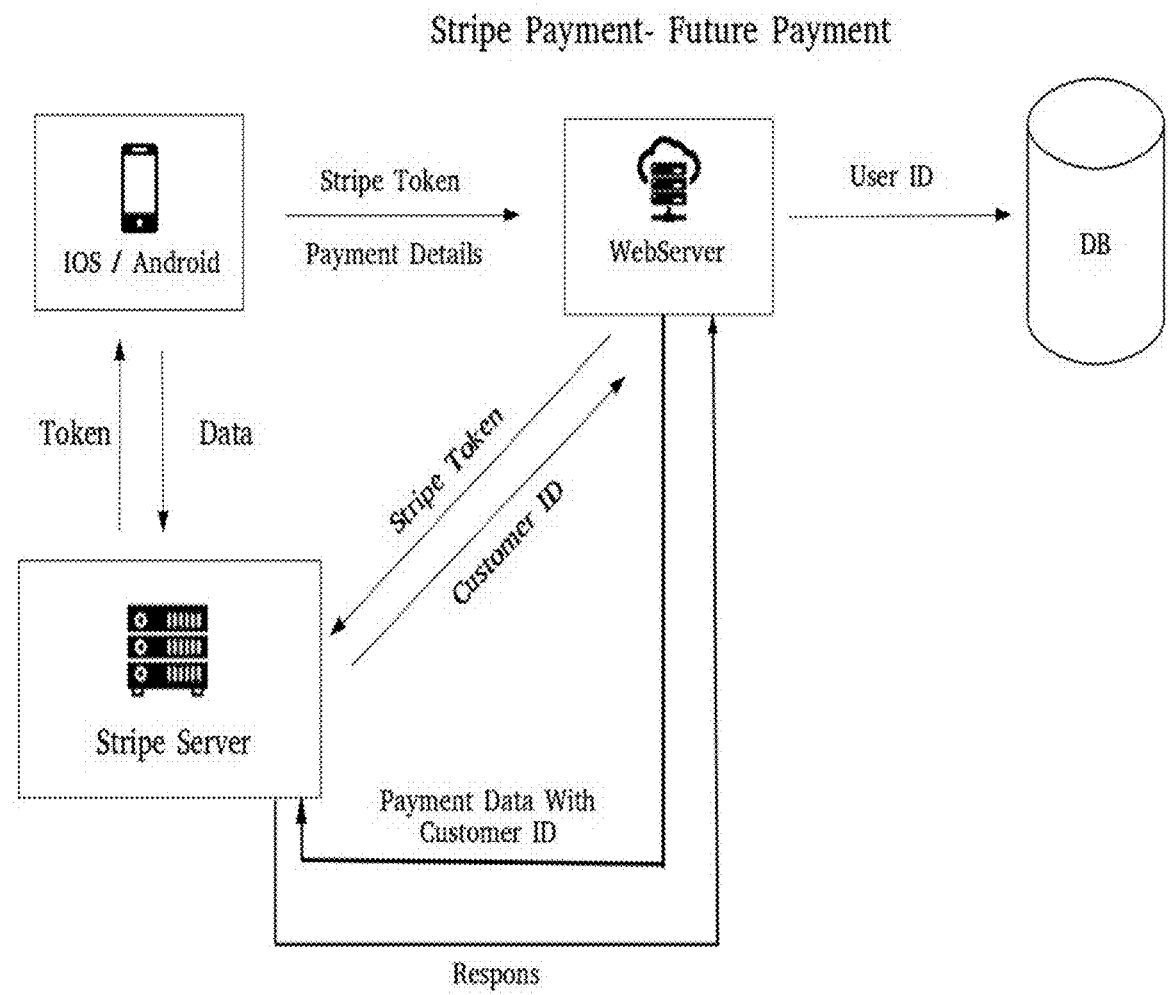
FIG. 11 illustrates a further alternative block diagram and communication flow when adding a non-limiting payment module to the disclosed system and method.
Figure 12:
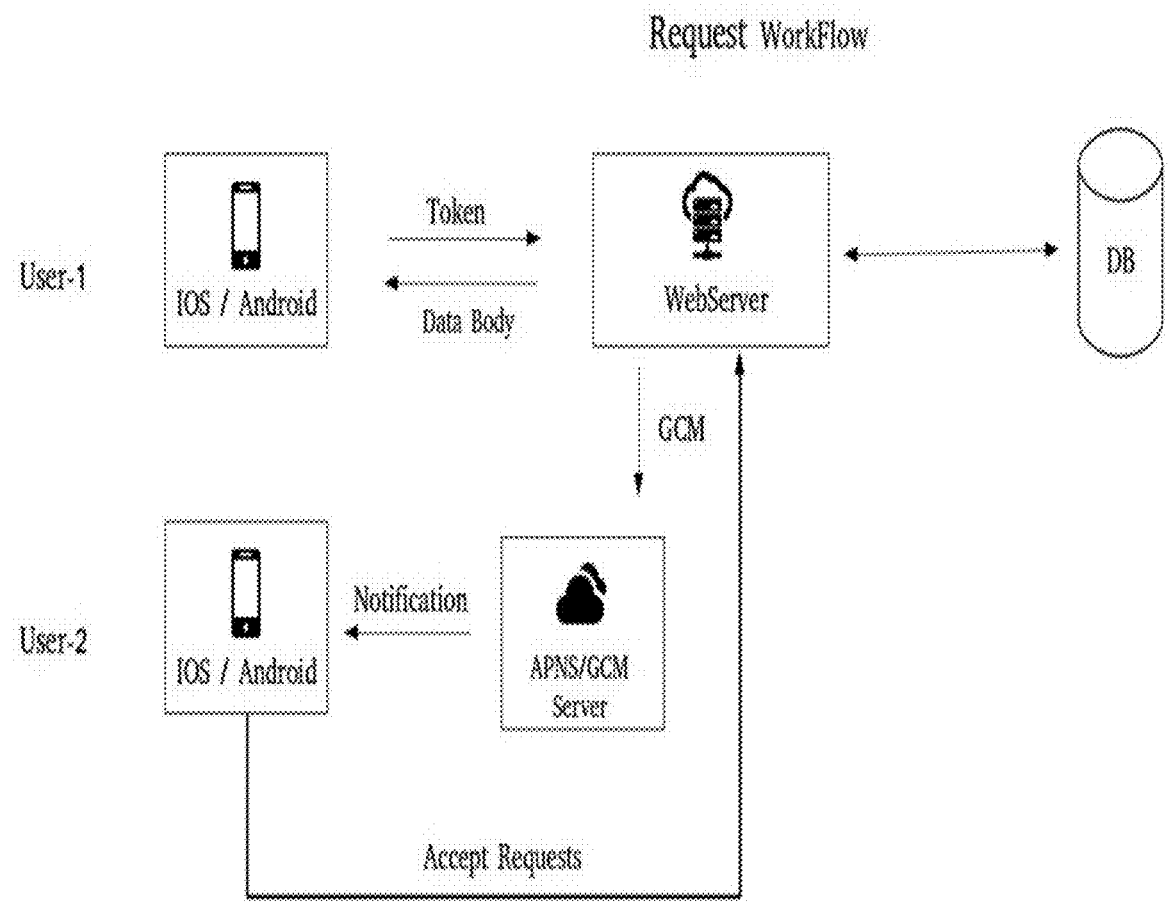
FIG. 12 illustrates a block diagram and process flow for request service by a consumer and accepting the service request by the service provider.

FIG. 3 illustrates a non-limiting embodiment for using and providing other non-Ride services with the App. Similar to FIG. 2, the left side of FIG. 3 shows the inner workings and process flow from the Provider's standpoint and the right side shows the inner workings and process flow from the consumer's standpoint. A geographical map that is used by both provider and consumer is provided and in communication with the App. Using the App, the provider enters that they are available to provide the service(s) they are registered for. Using the web service the provider's availability schedule and status are updated to the web server or other server used by the system to perform service search requests. Where the provider has indicated that they are currently available, when a matching (i.e. based on registered service and geographical location) service request from a consumer is processed by the web service, the service request is posted by the web service and appears on the provider's screen. The location of the requesting consumer and/or the provider can be visually shown on the provider's screen using an API, such as, but not limited to Google Map API. The provider can either accept, ignore or cancel the request. Where the request is accepted or cancelled, the web service processes the acceptance or cancellation accordingly. Where accepted the rate information can be provided/displayed and any previously posted reviews concerning the service requesting customer can be displayed on the provider's electronic device screen. Where the provider cancelled the request, the web service can process the action by removing the provider from the list of currently available providers sent to the consumer responsive to the service request.

Where the service request is accepted. A navigation API for directing the provider to the consumer's location, similar to that described above for FIG. 2 can be provided to the provider. A symbol, icon or other visual representation for the consumer can appear on the map of the provider's screen showing the location of the consumer. Once the service has been completed, both the provider and the consumer can enter ratings and/or other comments regarding the transaction/service provided and which can be viewed on the provider's screen.

From the consumer standpoint, after selecting the desired service category from the choice of categories displayed on the consumer's electronic device screen, a map can be displayed (i.e. through Google Map API, etc.) on the user's screen. The user is prompted or otherwise enters the location for the service and/or the system can be programmed to use the address entered for the consumer at the time of registration/signup by the consumer. The web service post and processes the consumer's request and determines which registered providers for the App are currently indicating that they are currently available and are shown or determined to be in the geographical area (i.e. nearby, a few miles away, etc.) of the consumer. The list of providers meeting these criteria (which can be one or more providers) is transmitted/sent to the electronic device of the consumer by the web service and displayed on the screen of the consumer's electronic device. The consumer can either select a provider, or end the listing of a specific provider as one of the available providers or end/cancel the service request using the web service. Where the consumer selects a service provider, the consumer and provider are connected, and a visual image (i.e. symbol, icon, etc.) representing the provider can appear on the map displayed on the consumer's screen. The consumer can track the movements of the provider driving to perform the service to the consumer's designated location similar to as discussed above for FIG. 2. Once the service(s) has(have) been completed, both the provider and the consumer can enter ratings, reviews and/or other comments regarding the transaction/service provided and which can be viewed on the consumer's screen.

It should also be recognized that for certain services, the customer may drive to the service provider as opposed to the service provider driving to the customer (e.g. attorney's office, physical therapy session, etc.). In such situations, the directions and navigation can be provided to the consumer and an image of the consumer's movements on the map driving to the service provider can be seen by the provider.

With respect to the consumer using the App, in one non-limiting embodiment, the map can be loaded using Google map v2 Api and displayed on the screen of the consumer's electronic device (e.g. smart phone, cell phone, tablet, laptop, smart watch, desktop computer, etc.). The consumer can search for service providers in the displayed map. Service providers can be categorized under Service category. Therefore, once the consumer selects a particular Service category, the web service processes the request and the available service providers (which can be based on their indication of being currently available and their geographical distance to the consumer) are plotted on the map as markers. When the consumer clicks on or otherwise selects one of the displayed markers, the consumer can be provided with additional information for the selected service provider, such as, but not limited to, the service provider's entered profile. The consumer can initiate a request for a service via phone call, SMS, email and/or normal request through the App. Where the service is under the Ride Pickup Delivery service, as discussed above, the consumer preferably provides additional details such as, but not limited to, pickup/delivery location, final destination location and time, etc. The entered locations can be loaded using Google Places API or similar technology. Once the provider accepts the consumer's request, the consumer can be notified using a notification technology (e.g. Firebase cloud messaging, etc.). The consumer can view active services and can track the provider's movements in the map. The provider's locations can be fetch in particular intervals by using their GPS location. The location fetch can be performed using Google Location API or similar technology and for navigation, Google Direction API or similar technology can be used. Once the provider completes the work/service, The user can review the provider and can provide a rating.

The system can also be programmed such that when the consumer posts a service request under a selected category, the consumer's request will appear on similar map seen on the provider's electronic device. Thus, the consumer preferably sees on their electronic device the mapped locations of available providers matching the search criteria (e.g. registered for the service, listed as currently available and nearby to the consumer), while the service provider sees the mapped location of consumers requesting service where the request similarly matches the above-noted conditions (i.e. registered, available and nearby). Though not preferred, it is also within the scope of the disclosure that consumers and/or providers are provided a list of currently available providers and/or service requests in text form (without a map) on their electronic device screens and no map visual feature is provided.

The provider can update their available status to "AVAILABLE" or "BUSY". In the AVAILABLE mode the providers can be searchable by the web service upon receipt of a service request from a consumer. Switching is performed by changing the status of the particular service provider in the electronic database that is in communication with the web service. As mentioned above, the providers can preferably view the consumer's request in the displayed map as markers. By clicking on or otherwise selecting the marker, additional information concerning the consumer is provided to the provider. The provider can either accept the request or reject it. Once provider accept the request, the route to the consumer's location can be displayed for viewing by the providing. Navigation can also be provided. The route can be plotted using Google Direction API or similar technology. Once the provider completes the work, they can review the consumer user and can provide a rating. The reviews and ratings provided by the consumers and the providers can be stored in the electronic database.

The web service and system can also be programmed such that when a provider accepts a service request, that the system/web service automatically changes the provider's status from AVAILABLE to BUSY and saves the change in the electronic database. Once the provider completes the service, they can then enter through their App that they are again AVAILABLE which causes their status to switch from BUSY to AVAILABLE again and such update is again saved in the electronic database. As an optional feature, the system/web service can also be programed to automatically switch the provider from BUSY to AVAILABLE once the web service/system learns that the provider has completed the service.

The system/web service can also be programmed to recognize any blackout periods entered by the provider. As a non-limiting example, a service provider may only want to perform their services during the afternoon. The service provider when setting up or updating their profile can indicate that only available to provide services from 12:01 pm to 5:00 pm. Thus, where a service request otherwise meeting the required conditions registered service and nearby location is sent to the system/web service at 7:30 pm, the system/web service, the service provider will not receive the service request.

Thus, the provider can also preferably view service requests posted by consumer in the displayed map and where the provider is interested in any request, then they can connect with consumer and take up the assignment.

The remaining drawings provide further examples of the above-described workflows and also illustrate certain components of the system and incorporating various payment platforms into the system.

With the mobile software App the user can perform one or more of the following (which is also dependent on whether they are a consumer or service provider) sign up, sign up with social media, log in, view and edit their profile, add a friend, accept friend, invite friends via Facebook and other social media sites, invite friends via SMS, add a vehicle, choose service(s), request service(s), accept service, track providers, schedule Availability, rate & review each other, view directions, add bank account details for making or receiving payments, add credit and debit card details, make payments.

Though not limiting, when a provider is available and switches to consumer mode the provider can remain showing on the map as available until they change to busy (where they have requested a service that has been accepted by another provider) or they accept a request as a provider. Service requests can pop up on the provider's phone or electronic device with a louder sound so the provider recognizes that a request or service has been made. In one non-limiting embodiment, an alert sound can be added to the notification or a custom sound that stands out can be used. When the user initiates a need for service, they can show up on the map displayed on the provider's electronic device so that a provider can see them under the provider's service category (i.e. provider's get a quick overview of active available requests). Thus, providers can see users in need and users can see available providers. The system and App can also be provided with corporate account access, instant chat capabilities, flexi-payment options, and a reference network.

In one non-limiting embodiment, the following technologies can be used for the system and App:
Android Studio 2.1, Min API: 16, Target API 23
Facebook SDK 4.11.0: Facebook SDK used for social media login
Google Cloud Messaging for notification
Google Map API v2: Used for Map.
Google Places API: For getting places and its geo information
Google Direction API: For Navigation for providers
Google Location API: For getting user's location
Stripe SDK: For payment and bank transaction
PayPal SDK: For payment
Firebase Cloud Messaging: For notificationa
WEB API
Can use Token based authentication to validate user.
Can Use Firebase to send instant notification to users.
Can uses Email service to send CODE to validate user and verify user's email ID.
Web service for the App can be developed in asp.net web API, though not considered limiting.
Framework Used: Dot net Framework 4.5
Database: MS SQL Server In addition to consumers and service providers, the App can also be used as a social media app between connected friends and particular for friends to request favors (i.e. rides, etc.) from other friends. Thus the App in conjunction with the system and method can be used to arrange for transport and other services among friends in an online/electronic social network. The App allows a user to find friends that are available to provide them with a ride to where they need to go. The system/App can show friends that are available (whether on a map or just a list of friends) for driving people and/or products to their destinations, such as, but not limited to local destinations. In one non-limiting embodiment, the system can use GPS and the user can see nearby connected friends nearby (e.g. within 2-3 miles radius, etc.) who are available to give the user a ride. Similar to the service provider described above, connected friends who are available to provide rides can turn on their "available" status using the App, which can cause the close by available friends on the user's displayed map or in a list of available drivers displayed on the screen, for a user who is looking to be driven somewhere. Driver friends can also get directions based on the passenger address input (or GPS location) and passengers see the driver friend on the map in the App interactively similar to how discuss above for FIG. 2. Users can tip or reimburse their friends a suggested amount based on distance traveled or any other amount they desire or can decide not to tip or reimburse. Where the App suggest an amount based on the distance traveled, the user can alter the amount and any payment system can be used to make the payment. The user can also similarly rate and review the friends, such as for reliability. Signing up can be similar to the sign up described above for FIG. 1 (e.g. set home address, car(s), add other addresses frequently used, addresses can also be added at a later time when looking for a ride, addresses can be determined by GPS location, etc.).

It is also recognized that the above described App and system and method can be used for borrowing or renting products and selling products. As discussed below, the App can also be used for selling or renting/lending products. The App can expand beyond work/jobs to goods for sale or to rent/lend. In one embodiment, additional categories and sub categories for renting/borrowing/selling goods can be provided. As a non-limiting example, a homeowner may need to cut up a fallen tree into smaller pieces for disposal, but the homeowner doesn't own a chainsaw. As the chainsaw is anticipated to only be needed for one-time use, the homeowner isn't interested in purchasing a chainsaw or purchasing a chainsaw for full price at a retail hardware store. Using the App the homeowner can run a search for chainsaws and be provided with currently available chainsaws that are available to rent and are within a certain distance from the homeowner. The homeowner can then connect, similar to the above, with the lender to finalize the terms and delivery or pick up of the chainsaw. Another non-limiting example could be a person looking to purchase a used item (i.e.

guitar, tennis racket, etc.) and uses the App to find people in the neighborhood or close by who has the desired item for sale.

The disclosure is not considered limited to any specific distance for determining whether or not to include or list a service provider for a search request. Additionally, the nature of the service requested or the number of registered service providers or available can also affect the distance limitation for filtering the search results. Accordingly, though it is preferred that the service provider be nearby so that they arrive relatively quickly to the consumer, it is recognized that this may not be possible or practical for certain services and such is not considered limiting. Thus, the distance selected can be a preconfigured fixed/static amount (i.e. 5 miles, 10 miles, 2-3 miles, within a zip code, within the same city or country, etc.) or the distance can be dynamic and calculated by the web service based on one or more factors (nature of services requested, number of available service providers, number of service providers registered whether or not registered).

It should be understood that the exemplary embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from their spirit and scope.

All components of the described system and their locations, electronic communication methods between the system components and Apps, electronic storage mechanisms, etc. discussed above or shown in the drawings, if any, are merely by way of example and are not considered limiting and other component(s) and their locations, electronic communication methods, electronic storage mechanisms, etc. can be chosen and used and all are considered within the scope of the disclosure.

Unless feature(s), part(s), component(s), characteristic(s) or function(s) described in the specification or shown in the drawings for a claim element, claim step or claim term specifically appear in the claim with the claim element, claim step or claim term, then the inventor does not consider such feature(s), part(s), component(s), characteristic(s) or function(s) to be included for the claim element, claim step or claim term in the claim when and if the claim element, claim step or claim term is interpreted or construed. Similarly, with respect to any "means for" elements in the claims, the inventor considers such language to require only the minimal number of features, components, steps, or parts from the specification to achieve the function of the "means for" language and not all of the features, components, steps or parts describe in the specification that are related to the function of the "means for" language.

The benefits, advantages, solutions to problems, and any element(s) that may cause any benefit, advantage, or solution to occur or become more pronounced are not to be construed or considered as a critical, required, or essential features or elements of any or all the claims.

While the disclosure has been described and disclosed in certain terms and has disclosed certain embodiments or modifications, persons skilled in the art who have acquainted themselves with the disclosure, will appreciate that it is not necessarily limited by such terms, nor to the specific embodiments and modification disclosed herein. Thus, a wide variety of alternatives, suggested by the teachings herein, can be practiced without departing from the spirit of the disclosure, and rights to such alternatives are particularly reserved and considered within the scope of the disclosure.

What is claimed is:

1. A system for providing a list of service providers for a particular requested service who are currently within a preconfigured distance from a current geographical area of a customer or another geographical area selected by a customer ("geographical location") and immediately available to provide a service for the customer at a specific time requested by the customer at the geographical location electronically provided by the customer to the system, comprising:

a first software App downloaded and running on a first electronic device of a consumer, the first electronic device having a first display screen;

a second software App downloaded and running on a second electronic device of a mobile service provider, the second electronic device having a second display screen, a web based service having an electronic system in electronic communication with the first software App and the second software app;

wherein the service provider registers at least one service that the service provider provides with the web based service using the second software App; and wherein the electronic system of the web based service programmed to receive electronic notice from the second software App when the mobile service provider is currently available to provide the at least one service that the service provider registered, said electronic system of the web based service programmed to electronically receive digital data representing a service request and the geographical location where the service request is needed from the first software App; wherein the electronic system of the web based service programmed to receive real time current GPS geographical location for the service provider transmitted by the second electronic device based on instructions from the second software App and programmed to receive real time current GPS geographical location for other mobile service providers who are also registered with the web based service:

wherein where the service request is for the at least one service registered by the service provider and where the service provider is indicating a currently available status and is geographically located within a preconfigured distance from the geographical location indicated in the received digital data the electronic system of the web based service is programmed to electronically generate a map with the map showing all registered service providers registered to provide the specific service requested and whose current physical location are within the preconfigured distance of the geographical location indicated in the received digital data and who have electronically informed the electronic system of the web based service that they are currently available to immediately provide their registered services and the electronic system of the web based service is programmed to electronically send the generated map with the shown service providers to the first electronic device for display on the first display screen of the first electronic device; wherein when the consumer electronically selects a particular service provider from the shown service providers on the map the electronic system of the web based service is programmed to also generate the map showing a driving route to the geographical location for the particular service provider from the current GPS geographical location of the selected service provider and the electronic system of the web based service is programmed to electronically send the generated map with the driving route to an electronic device of the selected service provider for display on the display screen of the electronic device of the selected service provider;

wherein the consumer can view and track the service provider's movements in the map and can fetch the service provider's locations in particular intervals by using his GPS location;

wherein the indication of currently available indicates that the service provider is currently able to immediately provide their registered services for the user at the geographical location provided in the service request by the consumer;

wherein the particular requested service is one type of service from a plurality of different types of services that the web based service registers services providers for and processes service request for using the electronic system.

2. The system for providing a list of service providers of claim 1 further comprising an electronic database in communication with the web service for storing profile and current real time location information for the service provider and services registered by the service provider, for storing profile and location information for the consumer, for storing an available or busy status for the service provider and for storing any blackout period for the service provider that is predetermined by the service provider.

3. The system for providing a list of service providers of claim 1 wherein when the specific service provider accepts the service request the web service is programmed to automatically change a status for the specific service provider from "available" to "busy"; wherein the web service is programmed to not include any service providers who have a "busy" status when generating a map of currently available service providers based on another service request from another consumer.

4. The system for providing a list of service providers of claim 2 wherein the web service is programmed to receive reviews and ratings entered by the consumer using the first mobile App and saves and stores the reviews and ratings in the electronic database.

5. The system for providing a list of service providers of claim 2 wherein the web service is programmed to receive reviews and ratings entered by the service provider using the second mobile App and saves and stores the reviews and ratings in the electronic database.

6. A computer implemented method for identifying currently available and nearby service providers for a particular service, said method comprising the steps of:

(a) electronically receiving a currently available to immediately provide services status and current real time GPS location information from one or more service providers who provide services at one or more customer locations throughout the day by a web service that is electronically sent from a first mobile App running on a first electronic device of each of the service providers, wherein the one or more service providers have previously registered one or more services that the service provider provides with the web service with the first mobile App;

(b) receiving an electronic request for services identifying a type of service from a consumer and the geographical location for the customer where the customer needs the service immediately performed by the web service that is electronically sent from a second mobile App running on a second electronic device of the consumer, wherein the consumer has previously registered his or her profile with the web service with the second mobile App;

(c) electronically determining by the web service which service providers from the one or more service providers who are registered with the web service for the type of service that are currently located within a preconfigured distance from the geographical location specified by the consumer in the request for services based on the services providers then current GPS geographical location and the services providers also having electronically informed the web service that they are currently available to immediately accept a service request and provide the requested services;

(d) electronically generating a map with the map showing all service providers registered to provide the specific service requested by the consumer who are currently within a preconfigured distance from the geographical location in the request for services and who have electronically informed the web service that they are currently available to immediately provide the requested services; and (e) electronically forwarding the generated map to the second mobile App by the web service for display on a screen of the second electronic device to provide the consumer with a visual of the currently available service providers as determined in step (c);

wherein the consumer can view and track the service provider's movements in the map and can fetch the service provider's locations in particular intervals by using his GPS location;

wherein the indication of currently available indicates that the service provider is currently able to travel to the geographical location provided in the request for services and immediately provide the requested services;

wherein the particular requested service is one type of service from a plurality of different types of services that the web based service registers services providers for and processes service request for using the electronic system.

7. The method for identifying of claim 6 wherein the first generated map includes markers representing the currently available service providers and a current real time location for the currently available service providers.

8. The method for identifying of claim 7 wherein each marker representing a different registered service provider who is currently available, registered for the service requested by the consumer and currently located within the preconfigured distance.

9. The method for identifying of claim 6 further comprising the step of electronically selecting a specific service provider by the consumer from the service providers displayed on the first map using the second mobile App and electronically forwarding the selection to the web service.

10. The method for identifying of claim 9 further comprising the step of automatically changing a status for the service provider selected by the consumer from "available" to "busy" by the web service upon receiving information that the selected service provider accepted the service request from the consumer.

11. The method for identifying of claim 9 further comprising the step of automatically electronically providing navigation, driving instructions or driving routes by the web service to the selected service provider through the first mobile App to assist the selected service provider in reaching the geographical location provided by the consumer in the request for services after the web service receives electronic acceptance of the service request from the selected service provider.

12. The method for identifying of claim 6 further comprising the step of receiving by the web service reviews and ratings entered by the consumer using the second mobile App and saving and storing the reviews and ratings in an electronic database in communication with the web service.

13. The method for identifying of claim 6 further comprising the step of receiving by the web service reviews and ratings entered by the service provider using the first mobile App and saving and storing the reviews and ratings in an electronic database in communication with the web service.

\* \* \* \* \*